United States Patent [19]
Washburn

[11] Patent Number: 5,722,702
[45] Date of Patent: Mar. 3, 1998

US005722702A

[54] PLASTIC PIPE COMPRESSION COUPLER

[75] Inventor: Robert B. Washburn, Amherst, Ohio

[73] Assignee: Arnco Corporation, Elyria, Ohio

[21] Appl. No.: 631,248

[22] Filed: Apr. 12, 1996

[51] Int. Cl.$^6$ ............................. F16L 33/20; F16L 21/06
[52] U.S. Cl. ..................... 285/340; 285/322; 285/369
[58] Field of Search ............................. 285/322, 323,
285/340, 369, 372, 417

[56] References Cited

U.S. PATENT DOCUMENTS

| | | |
|---|---|---|
| 1,898,623 | 2/1933 | Gammeter . |
| 2,383,692 | 8/1945 | Smith ............................. 285/322 |
| 2,738,993 | 3/1956 | Wilson . |
| 2,899,217 | 8/1959 | Ashbrook et al. . |
| 3,233,922 | 2/1966 | Evans . |
| 3,600,010 | 8/1971 | Downs, III et al. . |
| 3,637,239 | 1/1972 | Daniel . |
| 3,920,270 | 11/1975 | Babb, Jr. ............................. 285/104 |
| 4,109,941 | 8/1978 | Wood et al. . |
| 4,146,254 | 3/1979 | Turner et al. . |
| 4,288,112 | 9/1981 | Stoll ............................. 285/322 |
| 4,316,053 | 2/1982 | Rieffle . |
| 4,664,422 | 5/1987 | Straub . |
| 4,666,192 | 5/1987 | Zamora ............................. 285/322 |
| 4,777,669 | 10/1988 | Rogus . |
| 4,790,571 | 12/1988 | Montanari et al. ............................. 285/322 |
| 4,865,674 | 9/1989 | Durkin . |
| 4,953,898 | 9/1990 | Jorgensen et al. . |
| 5,029,908 | 7/1991 | Belisaire . |
| 5,039,141 | 8/1991 | Badoureaux . |
| 5,096,235 | 3/1992 | Oetiker . |
| 5,160,179 | 11/1992 | Takagi . |
| 5,282,654 | 2/1994 | Hendrickson . |
| 5,398,974 | 3/1995 | Mizukawa et al. . |
| 5,474,333 | 12/1995 | Sorkin ............................. 285/309 |
| 5,524,940 | 6/1996 | Wartlutt ............................. 285/322 |
| 5,584,512 | 12/1996 | Cartensen ............................. 285/369 |

FOREIGN PATENT DOCUMENTS

| | | | |
|---|---|---|---|
| 522729 | 6/1924 | France ............................. | 285/322 |
| 2689205 | 10/1993 | France ............................. | 285/322 |
| 966396 | 8/1957 | Germany ............................. | 285/322 |
| 448640 | 4/1968 | Switzerland ............................. | 285/322 |

*Primary Examiner*—Eric K. Nicholson
*Attorney, Agent, or Firm*—Pearne, Gordon, McCoy & Granger LLP

[57] ABSTRACT

A coupler for connecting a pair of plastic pipes aligned end-to-end includes a rigid plastic sleeve having a center portion and two end portions. An internal passage longitudinally extends through the sleeve and is sized for receiving ends of the pipes. The center portion has a pair of spaced apart annular sealing grooves located within the internal passage. Each of the end portions has circumferentially spaced apart slits longitudinally extending from an end of the sleeve and forming a plurality of elements deflectable toward and away from the pipes. An annular flexing groove is located within the internal passage and near an inner end of the slits for increasing the flexibility of the elements. Each of the end portions also has an annular locking groove located within the internal passage and on the elements. O-rings are located within the sealing grooves for encircling the pipes and forming seals between the sleeve and the pipes. Split metal locking rings are located within the locking grooves for encircling the pipes and locking the pipes in the sleeve when the locking rings are in engagement with the pipes. Band clamps encircle the elements of the sleeve radially outward of the locking rings for deflecting the elements toward the pipes to engage the locking rings with the pipes. Preferably the end portions of the sleeve also have an annular forming groove located within the internal passage and between the locking groove and the respective end of the sleeve. O-rings are located within the forming groove for encircling the pipes and rounding the ends of the pipes.

26 Claims, 2 Drawing Sheets

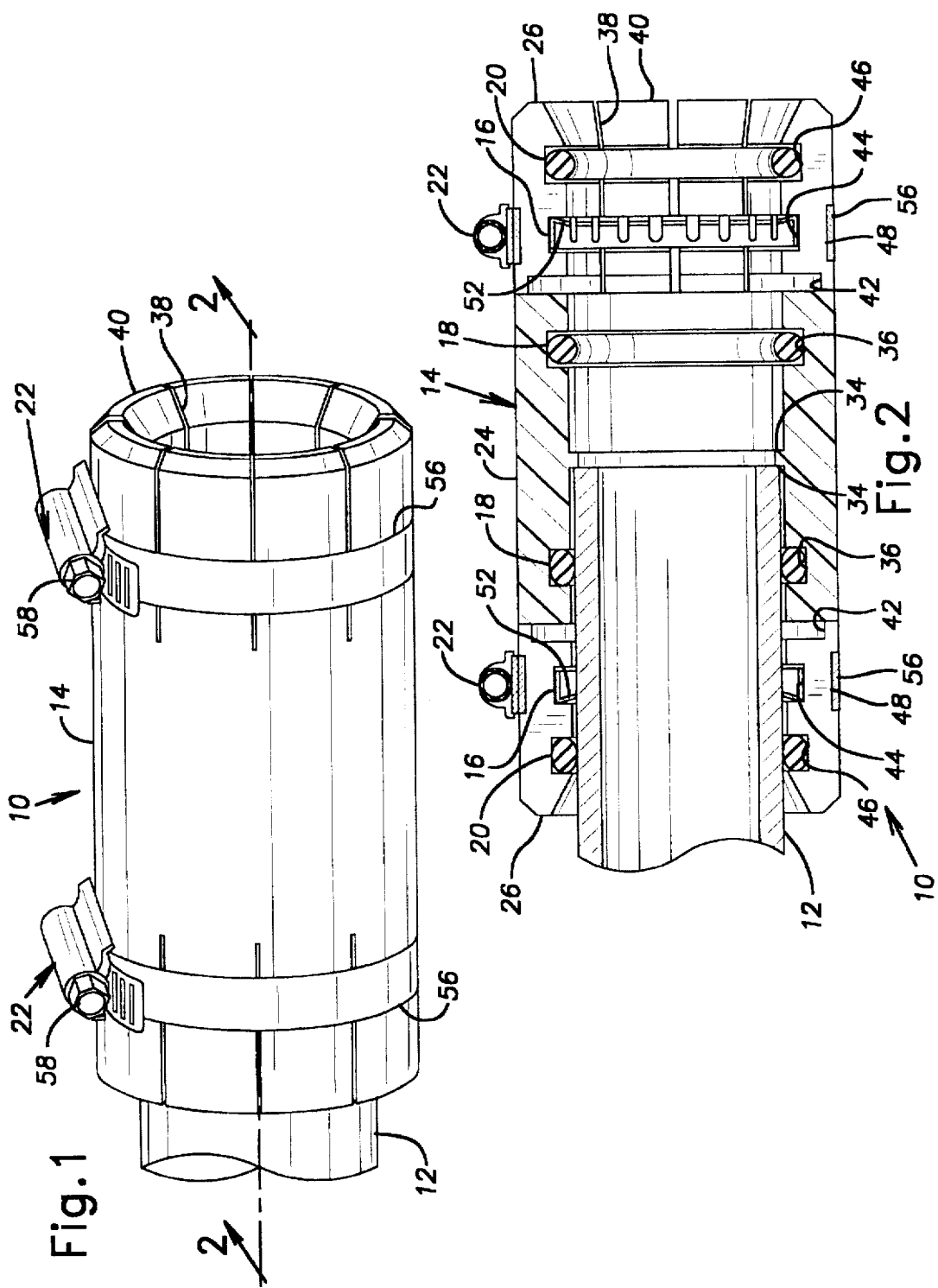

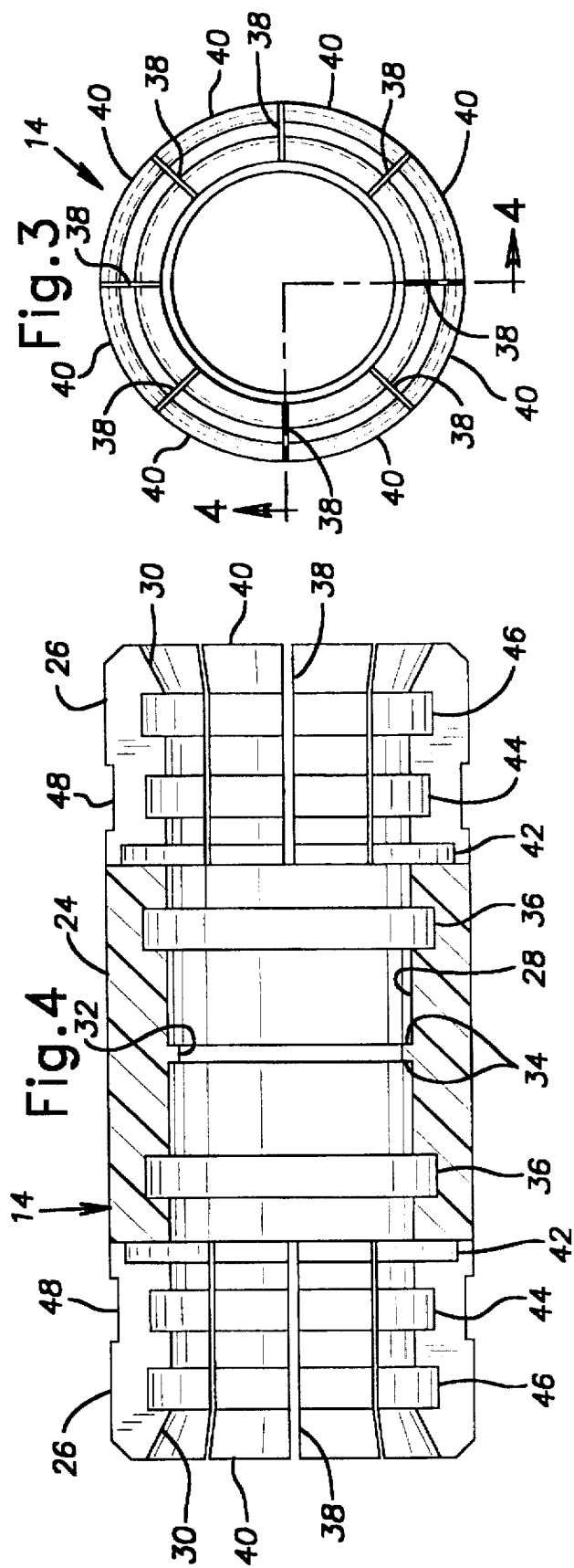
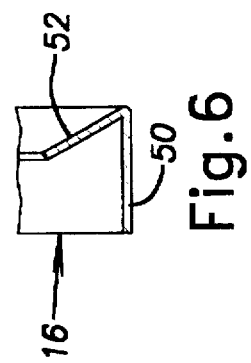
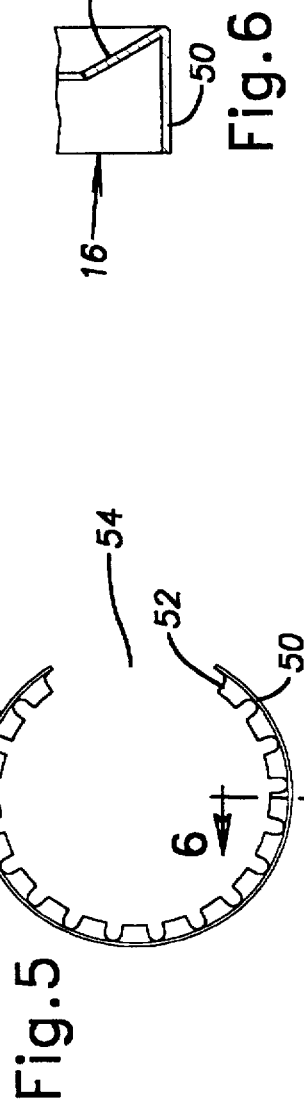

PLASTIC PIPE COMPRESSION COUPLER

BACKGROUND OF THE INVENTION

1. Field of the Invention

The present invention relates to coupling devices for connecting pipes and, more particularly, to a compression coupler for joining pipes made of plastic or other similar materials.

2. Description of Related Art

The use of plastic conduit or pipe has greatly increased in recent years in many uses formerly confined to metal pipe. For example, the telecommunication and power industry utilizes underground plastic pipes for electrical and fiber-optic lines. Numerous coupling devices for joining plastic pipes exist but are generally limited in one way or another.

One type of coupling device is a threaded coupler such as, for example, an aluminum threaded coupler (external) or a plastic threaded coupler (internal). The aluminum threaded coupler requires two people to install, is subject to corrosion, is difficult to install in tight spaces, and is not water or air tight. The plastic threaded coupler requires two people to install, reduces the internal diameter of the pipe, and is not water or air tight.

Another type of coupling device is a push-on coupler such as, for example, a plastic push-on coupler with a plastic lock, a plastic push-on coupler with a metal lock ring, or an aluminum push-on coupler with concentric threads. The plastic push-on coupler (with plastic lock) is expensive to produce because of multiple internal parts, has unpredictable pull-off resistance when used with hard-plastic pipes (<500 lb.), and is not able to work with pipes having large outside diameter tolerances. The plastic push-on coupler (with metal lock ring) requires a press to install, has unpredictable pull-off resistance (300–800 lb.), and is not able to work with pipes having large outside diameter tolerances. The aluminum push-on coupler requires a press to install, is difficult to install in tight spaces, is subject to corrosion, and is not able to work with pipes having large outside diameter tolerances.

Yet another type of coupling device is a compression coupler such as, for example, a plastic compression coupler with a rubber ring and threaded end cap, a plastic compression coupler with a plastic lock ring and threaded end cap, or a plastic compression coupler with a metal lock ring and threaded end cap. The plastic compression coupler (with rubber ring and threaded end cap) has low pull-off resistance (<200 lb.) and seals poorly under pressure. The plastic compression coupler (with plastic lock ring and threaded end cap) has intermediate pull-off resistance (400–600 lb.) and is not able to work with pipes having large outside diameter tolerances. The plastic compression coupler(with metal lock ring and threaded end cap) is not able to work with pipes having large outside diameter tolerances.

Yet another type of coupling device is a socket coupler such as, for example, a sleeve coupler with an interlocking groove or a cementable sleeve coupler. The sleeve coupler (with interlocking groove) requires a special groove tool for installation and requires plastic pipe having a relatively thick wall. The cementable sleeve coupler requires cement which must set up and is regulated by the EPA, and cannot by cemented to some plastic pipe materials such as HDPE.

Yet another type of coupling device is a fusion coupler such as, for example, an electrofusion coupler and a socket fusion coupler. The electrofusion coupler requires a power unit, is expensive to produce, and may melt plastic pipes having relatively thin walls. The socket fusion coupler requires a power unit, requires special tools for installation, and cannot be installed in a confined space.

Accordingly, there is a need in the art for an improved coupler to join plastic pipes. Additionally, there is a need for a coupler which is low cost, is easy to install by one person without special tools, is capable of being installed in confined spaces such as pits and pull boxes, is able to fit pipes having a large outer diameter tolerance, and is capable of being connected and disconnected. Furthermore, there is a need for a coupler which has a relatively high and predictable pull-off resistance (600–1000 lb.), is water and air tight (pressurizable to at least about 120 psi), is corrosion resistant, works with all common pipe wall thickness', and works with a wide variety of pipe materials such as PVC and HDPE.

SUMMARY OF THE INVENTION

The present invention provides a coupler for connecting an end of a pipe which overcomes at least some of the above-noted problems of the related art. The coupler includes a sleeve having an internal passage for sliding over the end of the pipe, circumferentially spaced apart slits longitudinally extending from an end of the sleeve and forming a plurality of elements deflectable toward and away from the pipe, and annular spaced-apart sealing and locking grooves within the internal passage. The locking groove being located on the elements. A sealing ring is located within the sealing groove, inwardly adjacent the locking groove, for encircling the pipe and forming a seal between the sleeve and the pipe. A locking ring is located within locking groove for encircling the pipe and locking the pipe in the sleeve when the locking ring is in engagement with the pipe. A compression device encircles the elements of the sleeve for deflecting the elements toward the pipe to engage the locking ring with the pipe.

BRIEF DESCRIPTION OF THE DRAWINGS

These and further features of the present invention will be apparent with reference to the following description and drawings, wherein:

FIG. 1 is a perspective view of a plastic pipe compression coupler according to the present invention;

FIG. 2 is a longitudinal cross-sectional view taken along line 2—2 of FIG. 1;

FIG. 3 is an end view of a coupler body of the compression coupler of FIG. 1;

FIG. 4 is a cross-sectional view taken along line 4—4 of FIG. 3;

FIG. 5 is an end view of a lock ring of the compression coupler of FIG. 1; and

FIG. 6 is an enlarged cross-sectional view taken along line 6—6 of FIG. 5.

DETAILED DESCRIPTION OF THE PREFERRED EMBODIMENT

FIGS. 1 and 2 illustrate a preferred embodiment of a compression coupler 10 according to the present invention for connecting two plastic conduits pipes 12 such as, for example, HDPE, PVC, ABS, or DELRIN plastic pipes. Note that, for clarity, only one plastic pipe 12 is shown in the figures. The compression coupler 10 includes a rigid body or sleeve 14, two locking rings 16 encircling the plastic pipe 12, two resilient sealing rings 18 encircling the plastic pipe 12, two forming rings 20 encircling the plastic pipe 12, and two compression devices 22 encircling the sleeve 14. It is noted that while the illustrated compression coupler 10 has a compression connection for each of the plastic pipes 12, alternatively a transition compression coupler could be provided such as, for example, having one end with a compression connection and the other end with a socket connection or threaded connection.

As best shown in FIGS. 3 and 4, the rigid sleeve 14 is generally cylindrical shaped and has a center portion 24 and two end portions 26. A central passage 28 longitudinally extends through the sleeve 14 and has a diameter sized for receiving the ends of the plastic pipes 12 to be joined. Each outer end of the central passage has a flare 30 to ease insertion of the plastic pipes 12 into the central passage 28.

The center portion 24 of the compression coupler 10 has a wall or rib 32 forming outward facing abutments 34 for limiting the length of the plastic pipes 12 inserted into the compression coupler 10. The rib 32 is located substantially at the middle of the center portion 24. The center portion 24 also has a pair of annular sealing grooves 36 formed in the inner wall surface which are sized for receiving the sealing rings 18. One of the grooves 36 is located near each outer end of the center portion 24.

Each end portion 26 of the compression coupler 10 has circumferentially spaced-apart and longitudinally extending slits 38 which form a plurality of longitudinally extending fingers or elements 40 which can be deflected radially toward or away from the plastic pipe 12. The slits 38 extend for the full length of the end portions 26 and are open at the respective ends of the sleeve 14. The illustrated compression coupler 10 has eight slits 38 forming eight elements 40. It is noted that a larger or smaller number of elements 40 can be formed. Each end portion 26 preferably has three annular spaced-apart grooves 42, 44, 46 formed in the inner wall surface. The first or flexing groove 42 is located at the inner end of the end portion 26, that is, at the inner end of the slits 38 and is sized for increasing the flexibility of the elements 40. The second or locking groove 44 is located on the elements 40 longitudinally outward of the first groove 42 and is sized for receiving one of the locking rings 16. The third or forming groove 46 is located on the elements 40 longitudinally outward of the second groove 44, that is, near the outward end of the elements 40 and is sized for receiving one of the forming rings. Each end portion 26 also preferably has a groove or recess 48 formed in the outer wall surface. Each recess 48 is located on the elements 40 radially outward of the second groove 44 and is sized for receiving at least a portion of one of the compression devices 22.

The sleeve 14 is preferably made from a plastic material which is optimized for a particular application. Harder plastics such as, for example, HDPE allow the sleeve 14 to be machined for low cost fabrication in a wide range of sizes as well as the fabrication of transition compression couplers having threaded connection at one end. Flexible plastics such as, for example, polypropylene allow the elements 40 of the sleeve 14 to reliably flex with low risk of stress cracks. Cementable plastics such as, for example, PVC or ABS allow the fabrication of transition compression couplers having a socket connection at one end. Moldable plastics allow the sleeve 14 to be injection molded at high volumes for low part costs.

As best shown in FIGS. 5 and 6, each locking ring 16 includes an outer wall 50 and a row of tangs 52 which angularly extend from the outer wall 50. The outer wall 50 is cylindrical and has a longitudinal length and diameter sized for insertion into the second groove 44 in the end portions 26 of the sleeve 14. The outer wall 50 has a split or opening 54 so that the locking ring 16 can be compressed or expanded. The fact that the locking ring 16 is split allows for a relatively large tolerance on the outside diameter of the plastic pipe 12. It has been observed that about +/−0.040 is an acceptable tolerance for the outside diameter of the plastic pipe 12 which is about 4 to 6 times the acceptable range for most existing plastic pipe couplers.

The tangs 52 extend radially inward and longitudinally rearward from a forward or outer end of the outer wall 50. The locking ring 16 is preferably stamped from a metal such as, for example, a stainless steel or other suitable metal which provides the required amount of resiliency and corrosion resistance.

The illustrated locking ring 16, for 1¼ inch diameter plastic pipe 12, is formed from a stamped strip of 27 gauge 304/306 stainless steel which is about 0.500 inch wide and about 4.368 inches long. The locking ring 16 has 14 tangs 52, each tang 52 has a length of about 0.186/0.181 inches and a width of about 3/16 inches. The stamped strip is formed to a radius of about 1.530 inches and the tangs 52 are formed to an angle of about 60 degrees. The number of tangs per inch may be larger or smaller depending on the diameter of the plastic pipe 12. The length of the tangs 52 varies depending on the hardness of the plastic pipe 12, that is, the tangs 52 are longer for softer materials and shorter for harder materials. The thickness of the tangs 52 can be larger to increase the pull-out loads (the load required to pull the plastic pipe 12 out of the compression coupler 10) obtained with plastic pipes 12 of a hard materials such as DELRIN or even metal. Alternatively, the locking ring 16 can be punched from a wider strip of material with several rows of tangs 52 on the same strip to increase the pull-off load on plastic pipes 12 of soft materials.

As best shown in FIG. 2, the locking rings 16 are located in the second grooves 44 of the end portions 26 of the sleeve 14. The locking rings 16 are oriented such that the tangs 52 are on the outward side of the groove 44, that is, the tangs 52 angularly extend from the outer end of the locking ring 16 toward the center portion 24 of the sleeve 14. It is noted that additional locking rings 16 can be employed in each of the end portions 26 to increase the loading area on the plastic pipe 12. For example two or three locking rings 16 could be utilized to double or triple the loading area.

As best shown in FIGS. 1 and 2, the sealing rings 18 are located in the grooves 36 in the center portion 24 of the sleeve 14. The sealing rings 18 of the illustrated embodiment are solid o-rings. The sealing rings 18 are sized to encircle and engage the outer surface of the plastic pipes 12. The sealing rings 18 are compressed between the plastic pipe 12 and the bottom surface of the groove 36 of the sleeve 14 to form a liquid-tight seal. Preferably, the sealing rings 18 form seals which withstand pressures of up to at least about 120 psi.

The sealing rings 18 can be made from any suitable material such as, for example rubber having the desired properties for a particular application such as, for example, durometer, chemical resistance, and thermal resistance. Sealing rings 18 made from a lower durometer material allow for easier installation and along with a larger diameter allow for a greater variation in the outside diameter of the plastic pipes. Sealing rings 18 made from a higher durometer material allow for higher pressure holding capability.

As best shown in FIG. 2, the forming rings 20 are located in the third grooves 46 in the end portions 26 of the sleeve 14. The forming rings 20 are sized to encircle and engage the outer surface of the plastic pipes 22 to form or "round" the plastic pipe 12 as it is inserted into the sleeve 14. It is noted that the compression coupling 10 can be constructed without the forming rings 20. The forming rings 20, however, are particularly desirable when the compression coupling 10 is used with flexible plastic pipes 12 which often have ends that are deformed or "out-of-round". If the ends of the plastic pipe 12 remain deformed, an adequate seal may not be formed with the sealing ring 18 and/or an adequate lock may not be formed with the locking ring 16.

The forming rings 20 can be made from any suitable material having the desired properties for a particular application such as, for example, hardness, chemical resistance, and thermal resistance. Forming rings 20 made from a softer material allow for easier installation and along with a larger diameter allow for a greater variation in the outside diameter of the plastic pipes. Forming rings 20 made from a harder material allow for greater forming capability. Preferably, the forming rings 20 are identical to the sealing rings 18. Therefore, the forming rings 20 of the illustrated embodiment are solid o-rings.

As best shown in FIGS. 1 and 2, the compression devices 22 encircle and engage the end portions 26 of the compression coupler 10. The compression devices 22 of the illustrated embodiment are band clamps which each have a band 56 and a locking screw 58. The bands 56 are located in the recesses 48 formed in the outer surface of the sleeve 14 so that the compression devices 22 are located radially outward from the locking rings 16. The compression devices 22 are easily tightened from the side by turning the locking screw 58 with a nut driver.

The compression devices 22 are sized for providing the proper loading capability for the plastic pipes 12. Plastic pipes 12 made of harder materials such as, for example, ABS and DELRIN, require more loading capability than plastic pipes 12 made of softer materials. It is noted that each of the compression devices 22 could alternatively be a modified screw thread and end cap or any other suitable device which applies radial compression. It is also noted that the compression devices 22 could be provided with an over the center pull latch for quick loading, could be wider to more evenly distribute the load, and could be tensioned with a spring-compensated locking screw to maintain constant tension for applications with variable service temperatures and/or flexible plastic pipe.

The compression coupler 10 is installed by inserting the end of a plastic pipe 12 into one of the end portions 26, through the forming ring 20, through the locking ring 16, through the sealing ring 18, and into the center portion 24 of the sleeve 14 until the end engages the abutment 34 in the center portion 24 of the sleeve 14. As the plastic pipe 12 passes through the forming ring 20, the forming ring 20 engages the exterior surface of the plastic pipe 12 and reduces or eliminates any deformation of the end of the plastic pipe 12. As the plastic pipe 12 passes through the locking ring 16, the split 54 in the locking ring 16 allows the locking ring 16 to circumferentially expand so that the plastic pipe 12 can be inserted by hand with minimal insertion effort. As the plastic pipe 12 passes through the sealing ring 20, the sealing ring 20 is compressed between the exterior surface of the plastic pipe 12 and the interior surface of sleeve 14 to form the fluid-tight seal.

After the plastic pipe 12 is fully inserted, the plastic pipe 12 is locked into position by tightening the compression device 22. The compression device 22 of the illustrated embodiment is tightened by turning the locking screw 58 with a nut driver. As the compression device 22 is tightened, the elements 40 of the end portion 26 of the sleeve 14 are deflected radially inwardly toward the plastic pipe 12 and the tangs 52 of the locking ring 16 are forced into locking engagement with and dig into the exterior surface of the plastic pipe 12. Once the plastic pipe 12 is engaged and held in this position, any longitudinal movement of the plastic pipe 12 away from the sleeve 14 induces the tangs 52 to dig deeper into the plastic pipe 12 and to resist the longitudinal outward movement. The angle of the tangs 52 relative to the plastic pipe 12 is such that pulling harder on the plastic pipe 12 results in driving the tangs 52 further into the wall of the plastic pipe 12. The pull-out load is equal to the force required to shear the surface of the plastic pipe 12 to a depth of about 0.030 inches for the width of each of the tangs 52 and for the length between the tangs 52 and the end of the plastic pipe 12. For a HDPE pipe, the required shearing force is about 25 to about 45 pounds for each $\frac{3}{16}$ inch wide tang 52.

After the plastic pipe 12 is locked into position, the other plastic pipe is then inserted into the other end portion 26 of the sleeve 14 and locked into position in the same manner as described above for the first plastic pipe 12. The compression coupler 10 can be removed by reversing the above-described installation procedure.

A compression coupler 10 for a 2 inch diameter plastic pipe 12 was produced with a CNC machined HDPE sleeve 14. The locking ring 16 was stamped from corrosion resistant steel with 25 tangs, each about $\frac{3}{16}$ inch wide. The compression coupler 10 provided an average pull-out load of about 790 pounds for HDPE pipes. The compression coupler 10 maintained a water-tight seal without any detectable leakage with a 20 ft. head of water for two weeks. The compression coupler also was short-term pressured with compressed air to over 220 psi without any detectable leakage.

From the above description, it can be appreciated that the compression coupler 10 of the present invention is connectable or disconnectable to standard plastic pipes 12 having a wide dimensional tolerance by one person without special tools and in tight places. It can also be appreciated that the compression coupler 10 of the present invention is producible at a relatively low cost, is water and air tight, is corrosion resistant, has good pull-off resistance, and works with all common plastic pipe wall thicknesses and materials.

Although particular embodiments of the invention have been described in detail, it will be understood that the invention is not limited correspondingly in scope, but includes all changes and modifications coming within the spirit and terms of the claims appended hereto.

What is claimed is:

1. A coupler for connecting an end of a pipe comprising:
   a sleeve having an internal passage for sliding over the end of the pipe, circumferentially spaced apart slits longitudinally extending from an end of said sleeve and forming a plurality of elements deflectable toward and away from the pipe, and annular sealing and locking grooves within said internal passage, said locking groove being located on said elements and axially spaced-apart from said sealing groove;
   a sealing ring within said sealing groove for encircling the pipe and forming a seal between said sleeve and the pipe;
   a locking ring within said locking groove for encircling the pipe and locking the pipe in said sleeve when said locking ring is in engagement with the pipe; and a compression device encircling said elements of said sleeve for deflecting said elements toward the pipe to engage said locking ring with the pipe.

2. The coupler according to claim 1, wherein said sleeve is formed of rigid plastic.

3. The coupler according to claim 1, wherein said sleeve has an annular flexing groove located within said internal passage and near an inner end of said slits for increasing flexibility of said elements.

4. A coupler for connecting an end of a pipe comprising:
 a sleeve having an internal passage for sliding over the end of the pipe, circumferentially spaced apart slits longitudinally extending from an end of said sleeve and forming a plurality of elements deflectable toward and away from the pipe, and annular sealing and locking grooves within said internal passage, said locking groove being located on said elements, wherein said sleeve has an annular forming groove located within said internal passage and between said locking groove and said end of said sleeve;
 a sealing ring within said sealing groove for encircling the pipe and forming a seal between said sleeve and the pipe;
 a locking ring within said locking groove for encircling the pipe and locking the pipe in said sleeve when said locking ring is in engagement with the pipe;
 a compression device encircling said elements of said sleeve for deflecting said elements toward the pipe to engage said locking ring with the pipe; and
 a forming ring within said forming groove for encircling the pipe and rounding the end of the pipe.

5. The coupler according to claim 4, wherein said forming ring is an o-ring.

6. The coupler according to claim 1, wherein said locking ring is formed of a metal.

7. The coupler according to claim 1, wherein said locking ring is a split ring such that the locking ring is circumferentially expandable and compressible.

8. The coupler according to claim 1, wherein said compression device is a band clamp.

9. The coupler according to claim 1, wherein said compression device is located radially outward of said locking ring.

10. A coupler for connecting a pair of pipes aligned end-to-end; said coupler comprising:
 a sleeve having a center portion, two end portions, and an internal passage longitudinally extending through said sleeve and sized for receiving ends of the pipes, said center portion having a pair of spaced apart annular sealing grooves located within said internal passage, each of said end portions having circumferentially spaced apart slits longitudinally extending from an end of said sleeve and forming a plurality of elements deflectable toward and away from the pipes, and each of said end portions also having an annular locking groove located within said internal passage on said elements and axially spaced-apart from an associated one of said sealing grooves;
 sealing rings within said sealing grooves for encircling the pipes and forming seals between said sleeve and the pipes;
 locking rings within said locking grooves for encircling the pipes and locking the pipes in said sleeve when said locking rings are in engagement with the pipes; and
 compression devices encircling said elements of said sleeve for deflecting said elements toward the pipes to engage said locking rings with the pipes.

11. The coupler according to claim 10, wherein said sleeve is formed of rigid plastic.

12. The coupler according to claim 10, wherein each of said end portions of said sleeve has an annular flexing groove located within said internal passage and near an inner end of said slits for increasing flexibility of said elements.

13. A coupler for connecting a pair of pipes aligned end-to-end; said coupler comprising:
 a sleeve having a center portion, two end portions, and an internal passage longitudinally extending through said sleeve and sized for receiving ends of the pipes, said center portion having a pair of spaced apart annular sealing grooves located within said internal passage, each of said end portions having circumferentially spaced apart slits longitudinally extending from an end of said sleeve and forming a plurality of elements deflectable toward and away from the pipes, and an annular locking groove located within said internal passage and on said elements, wherein each of said end portions of said sleeve has an annular forming groove located within said internal passage and between said locking groove and the respective end of said sleeve;
 sealing rings within said sealing grooves for encircling the pipes and forming seals between said sleeve and the pipes;
 locking rings within said locking grooves for encircling the pipes and locking the pipes in said sleeve when said locking rings are in engagement with the pipes;
 compression devices encircling said elements of said sleeve for deflecting said elements toward the pipes to engage said locking rings with the pipes; and
 forming rings within said forming groove for encircling the pipes and rounding the ends of the pipes.

14. The coupler according to claim 10, wherein said locking rings are formed of a metal.

15. The coupler according to claim 10, wherein said locking rings are split rings such that said locking rings are circumferentially expandable and compressible.

16. The coupler according to claim 10, wherein said compression devices are band clamps.

17. The coupler according to claim 10, wherein said compression devices are located radially outward of said locking rings.

18. A coupler for connecting a pair of plastic pipes aligned end-to-end; said coupler comprising:
 a generally rigid plastic sleeve having a generally center portion, two end portions, and an internal passage longitudinally extending through said sleeve and sized for receiving ends of the pipes, said center portion having a pair of spaced apart annular sealing grooves located within said internal passage, each of said end portions having circumferentially spaced apart slits longitudinally extending from an end of said sleeve and forming a plurality of elements deflectable toward and away from the pipes, and each of said end portions also having an annular locking groove located within said internal passage on said elements and axially spaced-apart from an associated one of said sealing grooves;
 sealing rings within said sealing grooves for encircling the pipes and forming seals between said sleeve and the pipes;
 split metal locking rings within said locking grooves for encircling the pipes and locking the pipes in said sleeve when said locking rings are in engagement with the pipes; and
 band clamps encircling said elements of said sleeve radially outward of said locking rings for deflecting said elements toward the pipes to engage said locking rings with the pipes.

19. The coupler according to claim 18, wherein each of said end portions of said sleeve has an annular flexing groove located within said internal passage and near an inner end of said slits for increasing flexibility of said elements.

20. A coupler for connecting a pair of plastic pipes aligned end-to-end; said coupler comprising:

a generally rigid plastic sleeve having a center portion, two end portions, and an internal passage longitudinally extending through said sleeve and sized for receiving ends of the pipes, said center portion having a pair of spaced apart annular sealing grooves located within said internal passage, each of said end portions having circumferentially spaced apart slits longitudinally extending from an end of said sleeve and forming a plurality of elements deflectable toward and away from the pipes, and an annular locking groove located within said internal passage and on said elements wherein each of said end portions of said sleeve has an annular forming groove located within said internal passage and between said locking groove and the respective end of said sleeve;

sealing rings within said sealing grooves for encircling the pipes and forming seals between said sleeve and the pipes;

split metal locking rings within said locking grooves for encircling the pipes and locking the pipes in said sleeve when said locking rings are in engagement with the pipes;

band clamps encircling said elements of said sleeve radially outward of said locking rings for deflecting said elements toward the pipes to engage said locking rings with the pipes; and forming rings within said forming groove for encircling the pipes and rounding the ends of the pipes.

21. The coupler according to claim 1, wherein said sealing groove is axially spaced-apart from said elements.

22. The coupler according to claim 1, wherein said sealing ring extends into said internal passage to form an interference fit with the pipe.

23. The coupler according to claim 10, wherein said locking grooves are axially spaced-apart from said elements.

24. The coupler according to claim 10, wherein said sealing rings extend into said internal passage to form an interference fit with the pipes.

25. The coupler according to claim 18, wherein said locking grooves are axially spaced-apart from said elements.

26. The coupler according to claim 18, wherein said sealing rings extend into said internal passage to form an interference fit with the pipes.

* * * * *

UNITED STATES PATENT AND TRADEMARK OFFICE
CERTIFICATE OF CORRECTION

PATENT NO. : 5,722,702
DATED : March 3, 1998
INVENTOR(S) : Robert B. Washburn

It is certified that error appears in the above-indentified patent and that said Letters Patent is hereby corrected as shown below:

Title page;

item [56] References Cited, U.S. Patent Documents, please delete "5,474,333" and insert therefor --5,474,335.

item [56] References Cited, Foreign Patent Documents, please delete "522729" and insert therefor --572729--.

Signed and Sealed this

Twenty-fifth Day of August, 1998

Attest:

BRUCE LEHMAN

*Attesting Officer*  *Commissioner of Patents and Trademarks*